United States Patent
Casati (10) Patent No.: US 12,452,653 B2
(45) Date of Patent: Oct. 21, 2025

(54) OPTIMIZED USER EQUIPMENT CAPABILITIES SIGNALING INCLUDING RECOVERY FROM DATABASE FAILURE

(71) Applicant: NOKIA TECHNOLOGIES OY, Espoo (FI)

(72) Inventor: Alessio Casati, West Molesey (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 454 days.

(21) Appl. No.: 17/845,218

(22) Filed: Jun. 21, 2022

(65) Prior Publication Data

US 2022/0369102 A1 Nov. 17, 2022

Related U.S. Application Data (63) Continuation of application No. 16/864,043, filed on Apr. 30, 2020, now Pat. No. 11,540,117.

(30) Foreign Application Priority Data

May 1, 2019 (WO) ............... PCT/US2019/030262

(51) Int. Cl.
*H04B 17/12* (2015.01)
*H04B 17/00* (2015.01)
(Continued)

(52) U.S. Cl.
CPC .............. *H04W 8/30* (2013.01); *H04W 8/02* (2013.01); *H04W 8/24* (2013.01); *H04W 24/04* (2013.01); *H04W 84/042* (2013.01)

(58) Field of Classification Search
CPC ........... H04W 8/30; H04W 8/02; H04W 8/24; H04W 24/04; H04W 84/042; H04L 41/0661
(Continued)

(56) References Cited

U.S. PATENT DOCUMENTS 8,848,514 B2  9/2014  Kompella et al.
10,993,142 B2  4/2021  Liu et al.
(Continued)

FOREIGN PATENT DOCUMENTS

CN  103501517 A  1/2014
CN  106326367 A  1/2017
(Continued)

OTHER PUBLICATIONS

Introduction of Radio Capabilities Signaling Optimisation feature, 3GPP Draft; S2-1904478-23501-RACS INTRO-R10, 3GP, Mobile Competence center, 650, Route Des Luciols; F-06921 Sophia-Antipolis Cedex; France, vol. SA WG2, No. Xian,P.R.China; Apr. 8, 2019-Apr. 12, 2019 Apr. 12, 2019 (Year: 2019).*

(Continued)

*Primary Examiner* — Tanmay K Shah
(74) *Attorney, Agent, or Firm* — ALSTON & BIRD LLP (57) ABSTRACT

Methods and apparatus, including computer program products, are provided for UE capability signaling. An apparatus is provided that is caused to at least: receive, from a user equipment capability management function, a message including a first restart counter value indicating a restart of the user equipment capability management function; inhibit, in response to receiving the first restart counter value, one or more old user equipment capability identifiers associated with a second restart counter value, the second restart counter value being associated to a pre-restart state of the user equipment capability management function; and send the first restart counter value indicating the restart of the user equipment capability management function. Related systems, methods, and articles of manufacture are also described.

26 Claims, 7 Drawing Sheets

(51) Int. Cl.
    *H04W 8/02*    (2009.01)
    *H04W 8/24*    (2009.01)
    *H04W 8/30*    (2009.01)
    *H04W 24/04*    (2009.01)
    *H04W 84/04*    (2009.01)

(58) Field of Classification Search
    USPC .......................................................... 455/424
    See application file for complete search history.

(56) References Cited

U.S. PATENT DOCUMENTS

| | | | |
|---|---|---|---|
| 11,044,780 | B2 | 6/2021 | Landais et al. |
| 2008/0037511 | A1 | 2/2008 | Casati et al. |
| 2009/0170426 | A1 | 7/2009 | Jung et al. |
| 2011/0176407 | A1 | 7/2011 | Campbell |
| 2014/0169277 | A1 | 6/2014 | Mildh et al. |
| 2015/0264637 | A1 | 9/2015 | Zaus et al. |
| 2016/0127136 | A1 | 5/2016 | Yin et al. |
| 2016/0198500 | A1 | 7/2016 | Merlin et al. |
| 2016/0295441 | A1 | 10/2016 | Yang et al. |
| 2018/0368202 | A1 | 12/2018 | Landais et al. |
| 2019/0007992 | A1 | 1/2019 | Kim et al. |
| 2019/0037441 | A1 | 1/2019 | Liu et al. |
| 2019/0268760 | A1 | 8/2019 | Tamura et al. |
| 2019/0349892 | A1 | 11/2019 | Rico Alvarino et al. |
| 2020/0351646 | A1 | 11/2020 | Casati |
| 2021/0067951 | A1 | 3/2021 | Liu et al. |
| 2021/0243648 | A1 | 8/2021 | Liu et al. |
| 2021/0266729 | A1 | 8/2021 | Casati |

FOREIGN PATENT DOCUMENTS

| | | | | |
|---|---|---|---|---|
| EP | 3777268 | A1 | 2/2021 | |
| EP | 3794855 | A1 | 3/2021 | |
| EP | 3854120 | A1 | 7/2021 | |
| JP | 2008-546347 | A | 12/2008 | |
| JP | 2014-099878 | A | 5/2014 | |
| JP | 2017/509234 | A | 3/2017 | |
| WO | WO 2009/072956 | A1 | 6/2009 | |
| WO | WO 2010/128589 | A1 | 11/2010 | |
| WO | WO-2011095256 | A1 * | 8/2011 | ............ H04W 76/06 |
| WO | 2019/007992 | A1 | 1/2019 | |
| WO | WO 2019/031540 | A1 | 2/2019 | |
| WO | 2019/195456 | A1 | 10/2019 | |
| WO | 2020/032491 | A1 | 2/2020 | |
| WO | 2020/198967 | A1 | 10/2020 | |

OTHER PUBLICATIONS

Intel, "Reverting to Manufacturer-Assigned UE Radio Capability ID", SA WG2 Meeting #S2-132, S2-1903803, (Apr. 8-12, 2019), 2 pages.
Office Action for Chinese Application No. 2001980097109.2 dated Apr. 18, 2024, 21 pages.
Qualcomm Incorporated et al., "New WID on CT aspects of optimisations on UE radio capability signalling", 3GPP CT WG1 Meeting #116, C1-192088, (Apr. 8-12, 2019), 4 pages.
Decision to Grant for Japanese Application No. 2021-564727 dated Nov. 13, 2023, 4 pages.
Office Action for Argentina Application No. 20200101186 dated Nov. 3, 2023, 8 pages.
Office Action for European Application No. 19726237.1 dated Dec. 13, 2023, 6 pages.
Office Action for Indonesian Application No. P00202109167 dated Dec. 8, 2023, 6 pages.
Office Action for Taiwan Application No. 111129180 dated Nov. 28, 2023, 21 pages.
Qualcomm Incorporated, "Provisioning of UE Capability ID", SA WG2 Meeting #132, S2-1903204, (Apr. 8-12, 2019), 3 pages.
Vivo, "Introducing Support of RAC S", 3GPP TSG-SA2 Meeting #132, S2-1903242, (Apr. 8-12, 2019), 17 pages.
U.S. Appl. No. 16/864,043, filed Apr. 30, 2020, U.S. Pat. No. 11,540,117, Patented.
Office Action for Japanese Application No. 2023-050186 dated May 27, 2024, 8 pages.
3GPP TS 23.007 V15.2.0, 3$^{rd}$ Generation Partnership Project; Technical Specification Group Core Network and Terminals; Restoration Procedures (Release 15) (Mar. 2019) 107 pages.
3GPP TS 23.501 V16.3.0, 3$^{rd}$ Generation Partnership Project; Technical Specification Group Services and System Aspects; System Architecture for the 5G System (5GS); Stage 2 (Release 16) (Dec. 2019) 417 pages.
3GPP TS 23.502 V16.3.0, 3$^{rd}$ Generation Partnership Project; Technical Specification Group Services and System Aspects; Procedures for the 5G System (5GS); Stage 2 (Release 16) (Dec. 2019) 558 pages.
3GPP TS 29.060 V15.4.0, 3$^{rd}$ Generation Partnership Project; Technical Specification Group Core Network and Terminals; General Packet Radio Service (GPRS); GPRS Tunnelling Protocol (GTP) Across the Gn and Gp Interface (Release 15) (Mar. 2019) 194 pages.
First Examination Report for Indian Application No. 202147054467 dated Apr. 28, 2022, 8 pages.
International Search Report and Written Opinion for Application No. PCT/US2019/030262 dated Jan. 16, 2020, 19 pages.
Introduction of Radio Capabilities Signalling Optimisation Feature, 3GPP TSG-SA WG2 Meeting #132, S2-1904478 (Apr. 2019) 18 pages.
Introduction of Radio Capabilities Signalling Optimisation Feature, 3GPP TSG-SA WG2 Meeting #133, S2-1904979 (May 2019) 19 pages.
New SID: Study on Optimisation on UE Radio Capability Signals, SP-180599, TSG SA Meeting #SP-80 (Jun. 2018) 4 pages.
New SID: Study on Optimisations on UE Radio Capability Signalling—NR/E-UTRA Aspects, RP-181459, TSG RAN Meeting #RP-80 (Jun. 2018) 4 pages.
Non-Final Office Action for U.S. Appl. No. 16/864,043 dated Jun. 15, 2021.
Notice of Acceptance for Bangladesh Application No. 147/2020/634 dated Feb. 15, 2022, 1 page.
Notice of Acceptance for Bangladesh Application No. 403/2021/633 dated Feb. 15, 2022, 1 page.
Notice of Allowance for Taiwanese Application No. 109114408 dated May 4, 2022, 3 pages.
Notice of Allowance for U.S. Appl. No. 16/864,043 dated Feb. 14, 2022.
Notice of Allowance for U.S. Appl. No. 16/864,043 dated Feb. 23, 2022.
Notice of Allowance for U.S. Appl. No. 16/864,043 dated Mar. 9, 2022.
Office Action for Bangladesh Patent Application No. 147/2020 dated Jun. 16, 2021, 1 page.
Office Action for Japanese Application No. 2021-564727 dated Dec. 27, 2022, 6 pages.
Proposed Allocation of Documents to Agenda Items for CT4#90; Status of Day 3, 3GPP TSG-CT WG4 Meeting #90, C4-191004 (Apr. 2019), 59 pages.
Restart Counter Increase After Path Failure Recovery, 3GPP TSG CT4 Meeting #64, C4-140281 (Jan. 2014), 4 pages.
Office Action for Argentina Application No. 20200101186 dated Jul. 16, 2024, 10 pages.
Decision to Grant for Chinese Application No. 201980097109.2 dated Feb. 18, 2025, 10 pages.
Decision to Grant for Japanese Application No. 2023-050186 dated Dec. 17, 2024, 4 pages.
Nokia et al., "Addressing UCMF restart for PLMN-assigned UE Radio Capability IDs case", SA WG2 Meeting #134, S2-1907022, (Jun. 24-28, 2019), 4 pages.
"3rd Generation Partnership Project; Technical Specification Group Services and System Aspects; Study on optimisations of UE radio capability signalling (Release 16)", 3GPP TR 23.743 v2.0.0, (Mar. 2019), 57 pages.
Qualcomm Incorporated et al., "Introduction of Radio Capabilities Signalling Optimisation feature", 3GPP TSG-SA WG2 Meeting #132, S2-1903202, (Apr. 8-12, 2019), 19 pages.

(56) References Cited

OTHER PUBLICATIONS

Intention to Grant for European Application No. 19726237.1 dated Aug. 29, 2025, 45 pages.
Office Action for Malaysian Application No. PI 2021006388 dated Aug. 25, 2025, 4 pages.

* cited by examiner

Send towards the AMF a registration request including a restart counter value 405

Receive, from the network, a request to provide UE capabilities information, when the restart counter value is stale 410

Provide to the network the UE's current capability information including radio capabilities 412

Receive another UE capability ID mapped to the UE capabilities information provided at 412, when the restart counter value is stale 415

Store the new UE capabilities ID (which includes the new restart counter) mapped to the UE capabilities information 420

OPTIMIZED USER EQUIPMENT CAPABILITIES SIGNALING INCLUDING RECOVERY FROM DATABASE FAILURE

CROSS-REFERENCE TO RELATED APPLICATIONS

This application is a continuation of U.S. Non-Provisional patent application Ser. No. 16/864,043, filed Apr. 30, 2020 and entitled "Optimized User Equipment Capabilities Signaling Including Recovery from Database Failure," which is a National Stage Entry of, and claims priority to and the benefit of, International Application No. PCT/US2019/030262, filed May 1, 2019, the entire contents of each of which is incorporated herein by reference in their entireties for all purposes.

FIELD

The subject matter described herein relates to wireless.

BACKGROUND

In cellular systems, the user equipment (UE) may provide to the network capabilities information, such as the UE's capabilities including its capabilities for the radio access network (RAN). The size of the UE's capabilities information may over time become significant. In 3GPP however, it is pursuing a work item on optimization of the UE's radio capabilities signaling in Rel-16 (see, e.g., 800025, FS_RACS, "Study on optimizations on UE radio capability signaling," and 800097, FS_RACS_RAN, "Study on optimizations on UE radio capability signaling—NR/E-UTRA Aspects").

SUMMARY

Methods and apparatus, including computer program products, are provided for user equipment capabilities signaling.

In some example embodiment, there may be provided an apparatus including at least one processor and at least one memory including computer program code, the at least one memory and the computer program code configured to, with the at least one processor, cause the apparatus to at least: receive, from a user equipment capability management function, a message including a first restart counter value indicating a restart of the user equipment capability management function; inhibit, in response to receiving the first restart counter value, one or more old user equipment capability identifiers associated with a second restart counter value, the second restart counter value being associated to a pre-restart state of the user equipment capability management function; and send the first restart counter value indicating the restart of the user equipment capability management function.

In some variations, one or more of the features disclosed herein including the following features can optionally be included in any feasible combination. The first restart counter value may be stored. When the apparatus receives a registration request including a user equipment capability identifier associated with the second restart counter value and/or when inspecting for one or more user equipment capability identifiers being stored for registered user equipment, the apparatus may compare the second restart counter value to the first restart counter value to determine whether the second restart counter value matches the first restart counter value. A message may be sent to the radio access network to trigger retrieval of a user equipment capability information for a user equipment. The message may be sent, when the apparatus does not include in its cache a user equipment capability identifier associated to the second restart counter value. A new user equipment capability identifier associated to the user equipment capability information including at least one radio capability may be assigned to the user equipment, wherein the new user equipment capability identifier may be associated to the first restart counter value. The assigned, new user equipment capability identifier may be sent to the user equipment in a registration accept message, a configuration update message, a globally unique temporary identifier reallocation command message, and/or a non-access-stratum signaling message. A new user equipment capability identifier and/or the first restart counter value may be sent to a radio access network to enable the radio access network to inhibit the use of the one or more old user equipment capability identifiers associated to the second restart counter value. The user equipment capability identifier associated with the first restart counter value and/or the first restart counter may be stored. The new user equipment capability identifier and/or the first restart counter value may be sent to a radio access network via an N2 interface or an S1 interface message. Context information including the old user equipment radio capability identifier associated to the second restart counter value may be sent toward one or more user equipment. The first restart counter value indicating the restart of the user equipment capability management function may be sent towards the radio access network. The apparatus may be comprised in or comprise a core network node, an access and mobility management function, and/or a mobility management entity.

In some example embodiment, there may be provided an apparatus including at least one processor and at least one memory including computer program code, the at least one memory and the computer program code configured to, with the at least one processor, cause the apparatus to at least: receive a first user equipment capability identifier associated with a first restart counter value indicating a restart of the user equipment capability management function; associate the first user equipment capability identifier with at least one user equipment capability; and store the first restart counter value and/or the first user equipment capability identifier associated to the at least one user equipment capability.

In some variations, one or more of the features disclosed herein including the following features can optionally be included in any feasible combination. A registration request including the first user equipment capability identifier associated to the first restart counter value may be sent to a core network via a radio access network. The first restart counter value may indicate a more recent restart of the user equipment capability management function when compared to a second restart counter value associated to a second user equipment capability identifier for the apparatus. In response to the received first user equipment capability identifier, use of the second user equipment capability identifier may be inhibited. The inhibition of the second user equipment capability identifier may include deleting the second user equipment capability identifier. One or more user equipment capability identifiers associated to the second restart counter value may be cached after receipt of the first user equipment capability identifier associated to the first restart counter value, and the cache may include the corresponding user equipment capability information. The first user equipment capability identifier associated to the first restart counter value may be received via a registration accept message, a configuration update message, a globally unique temporary identifier reallocation command message, and/or a non-access-stratum signaling message. The first user equipment capability identifier may be sent to a radio access network. The apparatus may be comprised in or comprise a user equipment.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

As noted, the user equipment (UE) may provide to the network UE capabilities information, which may cause inefficiencies including waste of storage resources, waste of spectrum, and the like as the size of the UE capabilities information increases. The 3GPP is proposing a solution that provides a centralized node, such as a UE Capabilities Management Function (UCMF), to allocate a UE radio capability ID (also referred to as a UE capability ID). The UE radio capability ID represents the UE's capabilities including the UE's radio capabilities with respect to the RAN. This UE radio capability ID may be provided by the network and/or UCMF to the UE, which stores the UE radio capability ID for the UE. The mapping of the UE radio capability ID to the associated UE's capabilities information may also be cached in the network, such as at a core network node, radio access node, and/or the like. Later, the UE radio capability ID may be sent by the UE to the network in one or more messages. In the 5G system for example, the UE radio capability ID may then be sent by the UE to the network in one or more registration messages, while in EPS (Evolved Packet System), the UE radio capability ID may then be sent by the UE to the network in one or more attach messages (and/or tracking area update messages). In either case, the network is aware (based on the UE radio capability ID) of the UE's capabilities information including the UE's radio capabilities (e.g., radio access technologies supported, radio frequency parameters, supported bands, etc.), without the network triggering a UE capabilities information enquiry process to obtain the UE's full set of radio capabilities (thus saving signaling over the radio).

However, the use of the centralized node, such as the UCMF, may give rise to a problem with respect to failure, such as a hardware failure, software failure, data loss or corruption, and/or other issue requiring a restart or other type of recovery. For example, if the UCMF fails and there is a corresponding data loss of some if not all of the UE capabilities information, such as the mappings from each of the UE radio capability IDs to the corresponding UE capabilities information (which include the UE's radio capabilities), the failure may cause a problem in a public land mobile network (PLMN) because there is no possibility for the PLMN to recover from the failure since the UEs' may have stale UE radio capability IDs while the RAN and core network may be caching stale UE radio capability IDs and the mapped UE capabilities information as well.

Upon the UCMF's recovery from the failure, a solution to the noted problem is to indicate (e.g., signal, send, tell, etc.) the UCMF's recovery to the access and mobility management functions (AMFs) in the 5G system or to the mobility management entities (MMEs) in EPS. And, this solution may also indicate to a UE to inhibit use of (e.g., erase, delete, flush, ignore, clean up, flag or indicate not to use, flag or indicate that the ID is stale, etc.) the UE radio capability ID stored at the UE which may no longer suitable for use with the network after the failure since the ID is stale. The use of the stale UE radio capability ID may create a problem with respect to the PLMN not knowing whether the UE's stored UE radio capability ID has been assigned before a UCMF failure or after the UCMF's recovery. In short, after the UCMF failure and restart, the PLMN does not know whether the UE radio capability ID provided by the UE is pre-failure (and thus stale and/or no longer active or valid) or post-recovery (and thus stale and/or active or valid). Hence, this approach has a drawback that the UE (which had received a UE radio capability ID before the failure) will need to be told to inhibit use of its "stale" UE radio capability ID and that the network cannot determine whether or not the UE is using a "stale" UE radio capability ID. As such, there is a need to determine at which time the UE capability ID was assigned (e.g., pre-UCMF recovery or post UCMF recovery).

In some example embodiments, the UE radio capability ID may be associated an indicator to indicate that the UCMF has been restarted. This indicator may take the form of a counter (hereinafter "restart counter value") of the UCMF in the PLMN. For example, a field of the UE radio capability ID may include the restart counter value. This restart counter value may represent whether the current UE radio capability ID is stale (e.g., associated with a pre-failure state of the UCMF and thus not associated with the latest value of the restart counter) or a new UE radio capability ID (e.g., associated with a post-recovery state of the UCMF and/or the latest value of the restart counter). Rather than include the restart counter value as a field in the UE radio capability ID, the restart counter value may be sent separate from the UE radio capability ID. In some example embodiments, the restart counter value may be sent and stored along with the UE radio capability ID.

When the UCMF recovers after a failure, the UCMF may indicate to the core network nodes a value for a restart counter, in accordance with some example embodiments.

This value may be another restart counter value (e.g., a "new restart counter value") to indicate that the UCMF's restart counter value has changed, such as after the recovery from the failure. In some example embodiments, the UCMF may indicate this new restart counter value to one or more core network nodes proactively (e.g., without an explicit request from one or more core network nodes) or when requested or contacted by the one or more core network nodes. For example, the UCMF may include the restart counter value in response to a core network node message, such as a request message and/or the like. In some example embodiments, one or more core network nodes may indicate the new restart counter values to one or more RAN nodes to which the core network nodes are in contact with. The core network nodes (which receive a new restart counter) may provide the new restart counter to the RAN proactively (via a message) or in the response messages to requests from the RAN nodes.

In some example embodiments, the use of some, if not all, of the stored UE radio capability ID (s) and the corresponding old mapping(s) (which are associated with the old, pre-UCMF failure and/or recover) may be inhibited at the UE, radio access network, core network nodes, and other nodes. In the network, the RAN and the core network may keep the "stale" UE radio capability IDs cached for the handling of any existing registered UEs (which may be using the stale UE radio capability IDS until the UE radio capability IDs are aged out of the cache according to a caching policy).

When the network such as the core network nodes and/or the like receive, from a UE, the UE radio capability ID, the network may compare the UE-provided restart counter value (which is included in the UE radio capability ID or provided together with the UE radio capability ID) to the latest UCMF-provided restart counter value. The UE radio capability ID including the restart counter value may be received in a 5G system registration message or an attach (or tracking area update) message in 4G/LTE/EPS. If there is a mismatch between the UE-provided restart counter value and the latest UCMF-provided restart counter value, the UE radio capability ID received from the UE may not be used (e.g., inhibited, etc.) by the network other than perhaps retrieve from its cache any available mapping of this UE radio capability ID (which is received from the UE) to the UE capabilities information. The mismatch signals to the network node that the UE is using a stale UE radio capability ID.

If the mismatch of the restart counter value is detected and/or the core network does not store the old, stale restart counter values of the UE radio capability IDs provided by the UEs in its cache of UE radio capability ID to UE capabilities information mappings, the network may obtain the UE capabilities information for that UE. To that end, the network may then request, receive, and/or retrieve the UE's capabilities information from the UE (e.g., via a UE capabilities information enquiry). However, if the core network caches old, stale UE radio capability IDs provided by the UE, the core network may use the new radio capability ID mapped to the these cached values of the UE capabilities information (which correspond to the old, stale UE radio capability ID received from the UE). In either the enquiry or cache case, once the core network has the current set of UE capabilities information for the UE, the core network may request the UCMF to assign a new UE radio capability ID for the set of UE capabilities information. The "new" here indicates that the UE radio capability ID is after a restart of the UCMF and/or more recent in time than the old, stale UE capability assigned by the UCMF before the failure and/or recovery.

The network may map and cache the UCMF's new UE radio capability ID associated with (e.g., include, mapped to, etc.) the new restart counter value to the UE capabilities information for the UE. The network may then indicate to the UE the new UE radio capability ID (which is associated with the new restart counter value) in the registration accept message in the 5G system or, as applicable, in an attach accept or tracking area update accept message in the EPS. Alternately, the new UE radio capability ID (which is associated to the new restart counter value) may be communicated to the UE in a UE configuration update message in the 5G system, a globally unique temporary identifier (GUTI) reallocation command message in the EPS, and/or other types of non-access-stratum signaling message initiated from the core network and received by the UE in the 5G system and/or EPS. The UE may store the UCMF assigned restart counter value alongside the UE radio capability ID (in the case the restart counter value is not part of the UE radio capability ID itself) as part of the set of UE radio capability IDs for the PLMN. If the UE has other UE radio capability IDs for another set of UE capabilities that the UE had signaled previously and the other UE radio capability IDs are associated to older UCMF restart counter values, the UE may, based on local caching policy that takes into account these are stale values, keep storing the UE Radio capability IDs associated with older UCMF restart counter values related to other potential UE radio configuration the UE may signal in the future. An aim of the operator may include minimization of the times the UE capabilities information are retrieved from the UE over the air interface, so if these UE radio capability IDs related to other radio configurations are retained in the UE, these may be signaled in the future with the expectation the network may also store these IDs and be able to interpret them. However, in the UE and the network, the stale UE radio capability IDs (e.g., those that are associated to the old UCMF restart counters) may be removed from cache/storage with priority versus those that are associated to the current UCMF restart counter. By repeating this process that occurs every time a UE indicates UE radio capability ID with a UCMF restart counter that is not current, or by the AMF/MME updating the UEs which have in their UE context in the AMF/MME UE radio capability IDs that are stale even before these UEs contact the AMF and MME by registration/mobility management or other non-access-stratum signaling messages, the UCMF's database of UE radio capability IDs (which are each associated to associated UE capabilities information) may be re-populated for the UEs over time. And, this may enable healing after the failure and recovery of the UCMF.

Figure 1A:
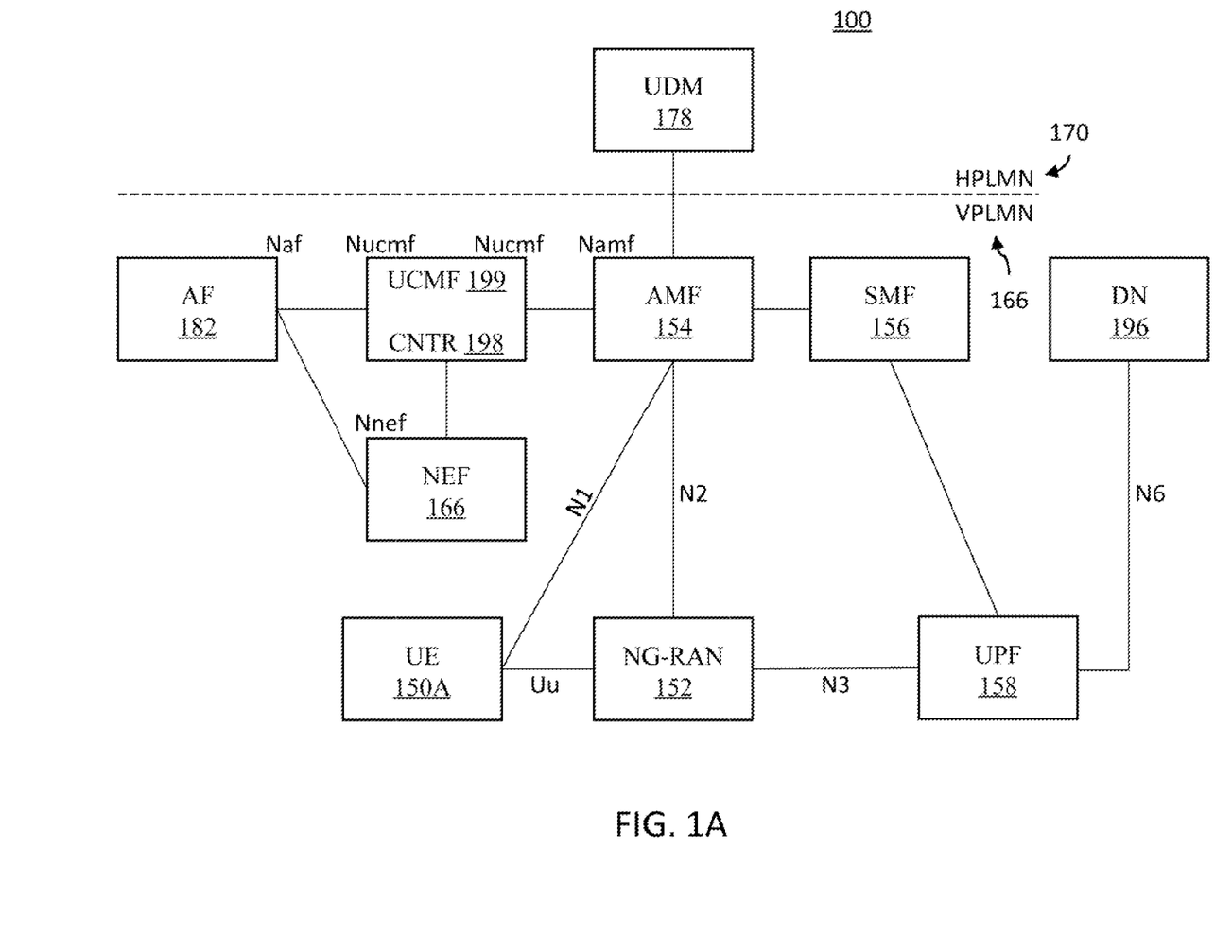
FIG. 1A depicts an example of a portion of a 5G system, in accordance with some example embodiments.

Before providing additional description regarding the UCMF's restart counter value in accordance with some example embodiments, an example of a portion of a 5G wireless network 100 is described with respect to FIG. 1A. FIG. 1A depicts an example of network 100, in accordance with some example embodiments. The network 100 may comprise 5G technology, as well as other types of radio technology as well.

The network 100 may include one or more user equipment (UE), such as UE 150A configured to wirelessly couple to at least one radio access network, such as 5G radio access network (RAN) 152 served by a wireless access point, such as a 5G base station, an LTE base station (eNB), a wireless local area network access point, a home base station, and/or other type of wireless access point. When visiting a network, the UE may access the network's radio access network.

The network 100 may include a core network, which may include an access and mobility management function (AMF) 154, a session management function (SMF) 156, a user plane function (UPF) 158, a network exposure function (NEF) 166, an application function (AF) 182, and the like. In the example of FIG. 1A, devices 152-164 may be associated with a visiting public land mobile network (VPLMN) 166. The UPF may interface with a data network (DN) 196. The AMF 178 may interface with a user data management function (UDM) in a home public land mobile network (HPLMN) 170.

In the example of FIG. 1A, the network includes UCMF 199 including a counter 198 configured to provide the restart counter values, in accordance with some example embodiments. The UCMF may be a core network node, and the UCMF may interface to an AMF 154, the NEF 166, the AF 172, and/or other nodes as well.

FIG. 1A also depicts service interfaces, such as N1, N2, N6, etc. The architecture, nodes (including AMF, SMF, as well as other devices depicted at FIG. 1A), and the service interfaces may be defined in accordance with a standard, such as 3GPP TS 23.501, although other standards as well as proprietary interfaces may be used.

Some of the nodes of the network 100 may be implemented as dedicated, physical devices, while other elements may be virtualized. For example, a core network node such as the AMF, SMF, etc., may be hosted on a dedicated machine, or it may be hosted on a virtual machine (which is executed on, for example, a computer or other type of physical data processor) and instantiated dynamically with other virtualized core network nodes functions. Moreover, although FIG. 1A depicts a certain quantity of nodes (e.g., a single RAN, AMF, etc.), other quantities of each of the nodes may be implemented as well. And although FIG. 1A depicts a single visiting network and a single home network, other quantities of visiting and/or home networks may be included as well.

Figure 1B:
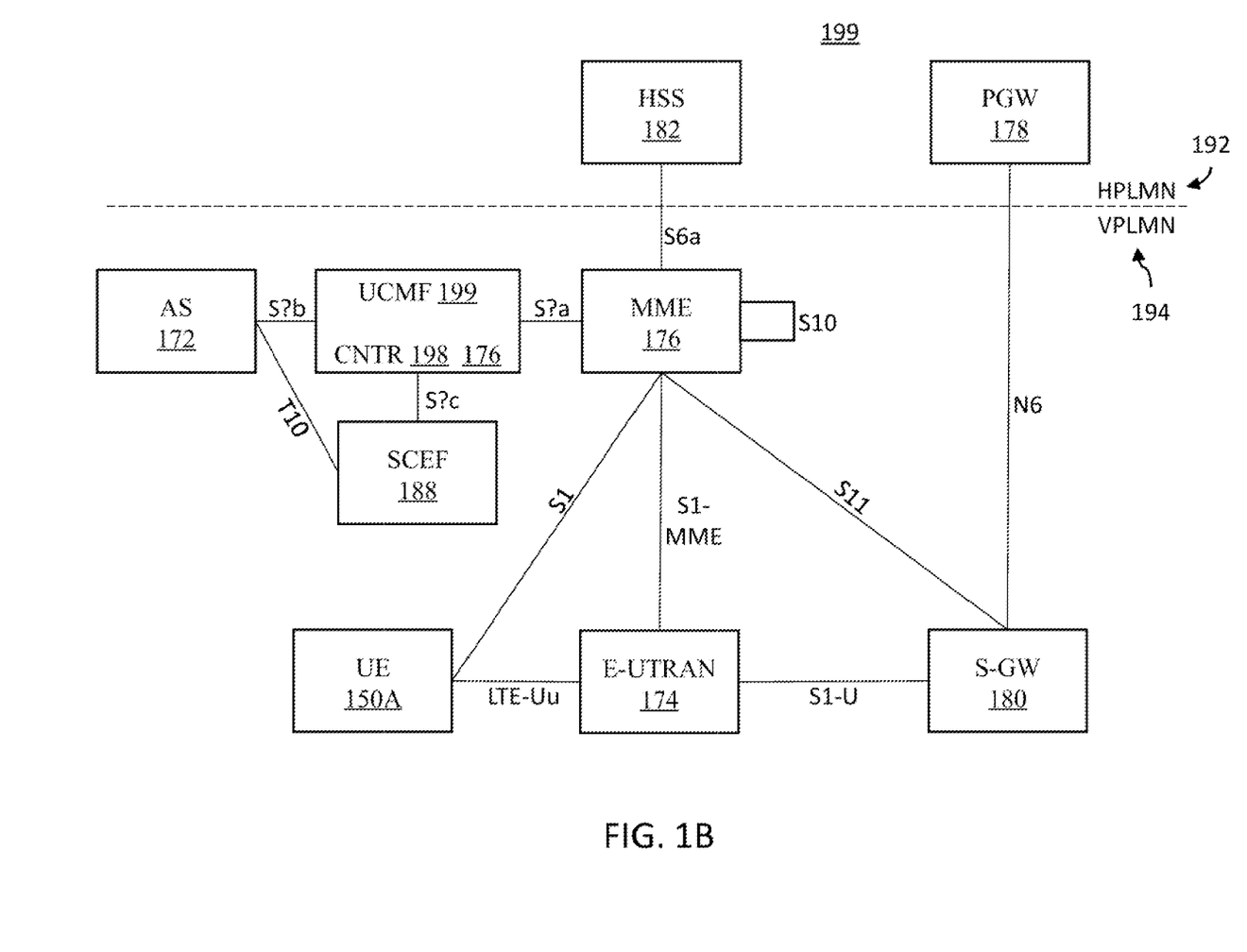
FIG. 1B depicts an example of a portion of an Evolved Packet System, in accordance with some example embodiments.

FIG. 1B depicts an example of an EPS network 199 implementation, in accordance with some example embodiments. FIG. 1B depicts the UCMF 199, which interfaces to a services capabilities exposure function (SCEF) 188, an application function (AS) 172, and a mobility management entity (MME) 176. The network 199 also includes a UE 150A, an Evolved UMTS Terrestrial Radio Access Network (E-UTRAN) 174, a serving gateway (S-GW) 180, a packet gateway (PGW) 178, and a home subscriber server (HSS) 182.

Figure 2:
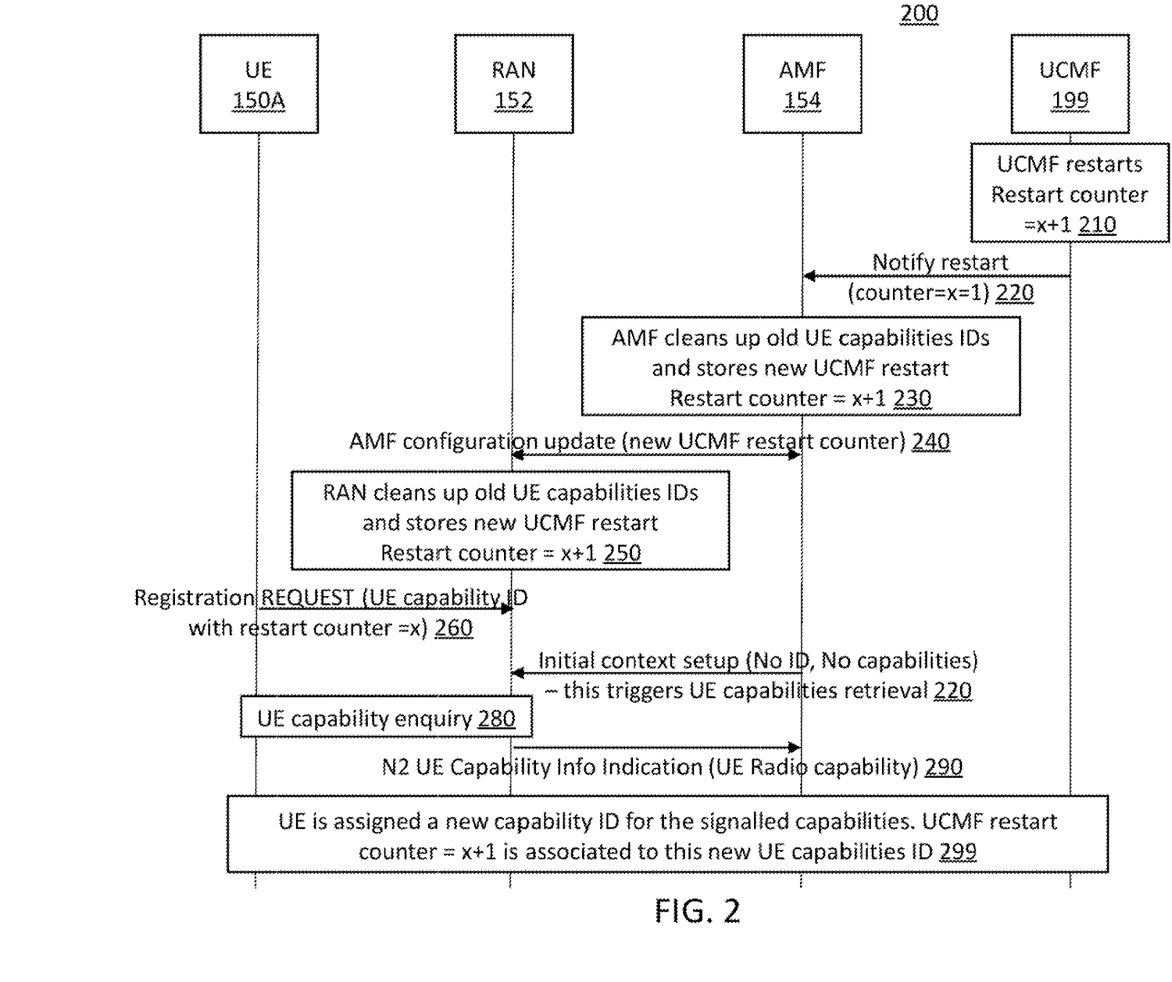
FIG. 2 depicts an example of a process flow for handling UCMF failures and recovery, in accordance with some example embodiments.

FIG. 2 depicts an example of a process 200, for use with the UCMF's restart counter value, in accordance with some example embodiments.

At 210, the UCMF 199 may reset the UCMF's restart counter 198, which generates a new restart counter value to indicate that the UCMF has recovered after a failure, in accordance with some example embodiments. The failure and recovery may be a total failure or a partial failure related to hardware, software, data loss, or some other reason causing a need for a restart of the UCMF (e.g., an interrupt in the operation of the UCMF or a corruption of the UE radio capability IDs or mapped information). In the FIG. 2 example, the prior, old, stale counter value, "x," is incremented by 1 ("+1") to indicate the new restart counter value. Thus, a network node or UE may be able to determine that a UE radio capability ID including the prior restart counter value of "x" represents a "stale" UE radio capability ID that should not be used. In some example embodiments, the restart counter values are stored in a persistent manner in UCMF persistent storage to enable, upon recovery after failure, to increment the value of the restart counter value.

At 220, the UCMF 199 may notify another node, such as the AMF 154, of the new restart counter value, in accordance with some example embodiments. In response to the resetting of the counter at 210, the UCMF may notify the AMF of the new restart counter value by sending a message. It can be appreciated based on this disclosure that any AMF (which may receive a restart counter from the UCMF in a proactive manner as indicated in FIG. 2) may have entered in contact with the UCMF at least once and may obtained at that time a first value of the UCMF restart counter for the UCMF and may have also subscribed to these notification from the UCMF (or this can be configured in the UCMF to be an automatic subscription any time the AMF has first contacted the UCMF). Alternatively or additionally, the new value of the restart counter may be provided in a response message to a request from the UCMF (e.g., a request to assign a new UE radio capability ID for a UE or a request to resolve a UE radio capability ID that a UE has provided in a registration request message to the AMF.

At 230, the network node, such as the AMF 154, may inhibit the use of one or more old, stale UE radio capability ID (s) and may store the new restart counter value received at 220, in accordance with some example embodiments. The AMF may receive the new restart counter value and determine (e.g., based on a comparison to what was stored before the failure and recovery of the UCMF) that the UCMF has reset the counter 198 (e.g., due to a failure and recovery). As such, the AMF may inhibit the use of (e.g., erase, delete, flush, ignore, clean up, flag or indicate not to use, flag or indicate that the ID is stale, etc.) some if not all of the old UE radio capability IDs associated with the old, stale restart counter values of the UCMF (and/or any associated mapped UE capability information). For example, the AMF may delete these old UE radio capability IDs or, alternatively, cache these old UE radio capability IDs along with the mapped UE capabilities information with an indication that they are stale. Caching may allow the UE capabilities information to be re-assigned to the new UE radio capability ID which may reduce the need to request, via a UE capability enquiry message, from the UE their UE full set of capabilities information. In the FIG. 2 example, the new restart counter value is x+1 while the stored restart counter is x, so there is no match and the AMF may then delete or cache as stale any UE radio capability IDs included or associated with the older, stored restart counter is x. The AMF may, as noted, store the new restart counter value received at 220.

At 240, the network node such as the AMF 154 may send to the RAN 152 the new restart counter value, in accordance with some example embodiments. For example, the AMF may send, as part of a AMF configuration update message, the UCMF's new restart counter value (which in this example is "x+1") to the RAN in order to update the RAN with the UCMF's new restart counter value.

At 250, the RAN 152 may inhibit the use of one or more old, stale UE radio capability ID (s) and may store the new restart counter value received at 240, in accordance with some example embodiments. The RAN 152 may, as in the case of the AMF at 230, may cache these old UE radio capability IDs along with the mapped UE capabilities information with an indication that they are stale. In this way, the old UE radio capability IDs may be retrieved from cache if needed in the RAN for UEs that are registered, connected, and continue to use the old values in their RAN context.

Returning to the previous example in which the new restart counter value is x+1 and the stored restart counter is x, the RAN may delete one or more UE radio capability IDs including or associated with the restart counter value <x+1, or keep them cached as stale values in the event these are still needed in the RAN for UEs that are still registered and connected and keep using the old values in their RAN context. The RAN may, as noted, store the new restart counter value x+1 received at 220.

At 260, the UE 150A may send to the network a message including the UE radio capability ID that further includes a restart counter value, in accordance with some example embodiments. For example, the UE 150A may send to the AMF 154 a registration request. The registration request may include the UE radio capability ID including a restart counter value, which in the example of FIG. 2 is x. In response, the AMF may determine (e.g., based on a comparison to what was stored before the failure and recovery of the UCMF) that the UE has a stale UE radio capability ID as the new restart counter in this example is x+1. When this is the case and/or the AMF has no longer the stale UE radio capability ID cached, the AMF may send a message to the RAN to retrieve the UE's capabilities information.

At 270, the AMF 154 may send a message, such as an initial context set up request message to the RAN 152 to trigger the RAN to enquire about the UE's capabilities information, in accordance with some example embodiments. For example, an initial context step up request may include an indication, such as no UE radio capability ID and/or no capabilities. When received at the RAN, the indication may trigger the RAN to trigger a UE capabilities enquire process to obtained information about the UE capabilities.

At 280, the UE capabilities enquiry takes place, in accordance with some example embodiments. For example, the RAN 152 may send a UE capability enquiry message to the UE 150A. This message represents a network request to the UE to provide the UE's capabilities information and, in particular, the UE's network including RAN capabilities information. In response to the UE capability enquiry message, the UE may respond to the RAN with a UE capability information.

At 290, the RAN 152 may provide, via the N2 interface, to the AMF 154 the UE capability information including the UE's radio capability, in accordance with some example embodiments.

At 299, the UE may be assigned a new UE radio capability ID, in accordance with some example embodiments. The assigned new UE radio capability ID may be mapped to the UE's capabilities information signaled at 290 or the UE capabilities obtained from cache (e.g., UE capabilities information that is still valid but mapped to an old, stale UE radio capability ID). Now that the AMF has the current UE capability information, the AMF may request the UCMF to provide a UE radio capability ID for the UE's capability information, such as the radio capabilities of the UE. When the UCMF returns this value to the AMF, the AMF provides this new UE radio capabilities ID value to the UE (associated with the new UCMF restart counter which is, in this example, "x+1") in a registration accept message. Alternately, the UE radio capability ID (including or alongside the new UCMF restart counter value) may be communicated to the UE in a UE configuration update message in the 5G system or other type of non-access-stratum signaling message initiated from the core network and received by the UE in the 5GS. Also, the AMF may provide this new value of the UE radio capability ID (including or alongside the new UCMF restart counter value which is, in this example, "x+1") to the RAN in a UE context update or initial context setup request context message as specified in 3GPP TS 23.501 and 3GPP TS 38.413. When the UE receives a UE radio capability ID (which may be associated with the new UCMF restart counter), the UE may retain (which may be subject to caching policy that may take into account these are stale IDs) the other UE radio capability IDs that it stores for the PLMN for other radio configurations with older restart counter values so UE can still indicate these to the network when it changes radio configuration in case the network also cached the stale values (an aim here may be to minimize the need for triggering the UE radio capability enquiry 280).

Figure 3:
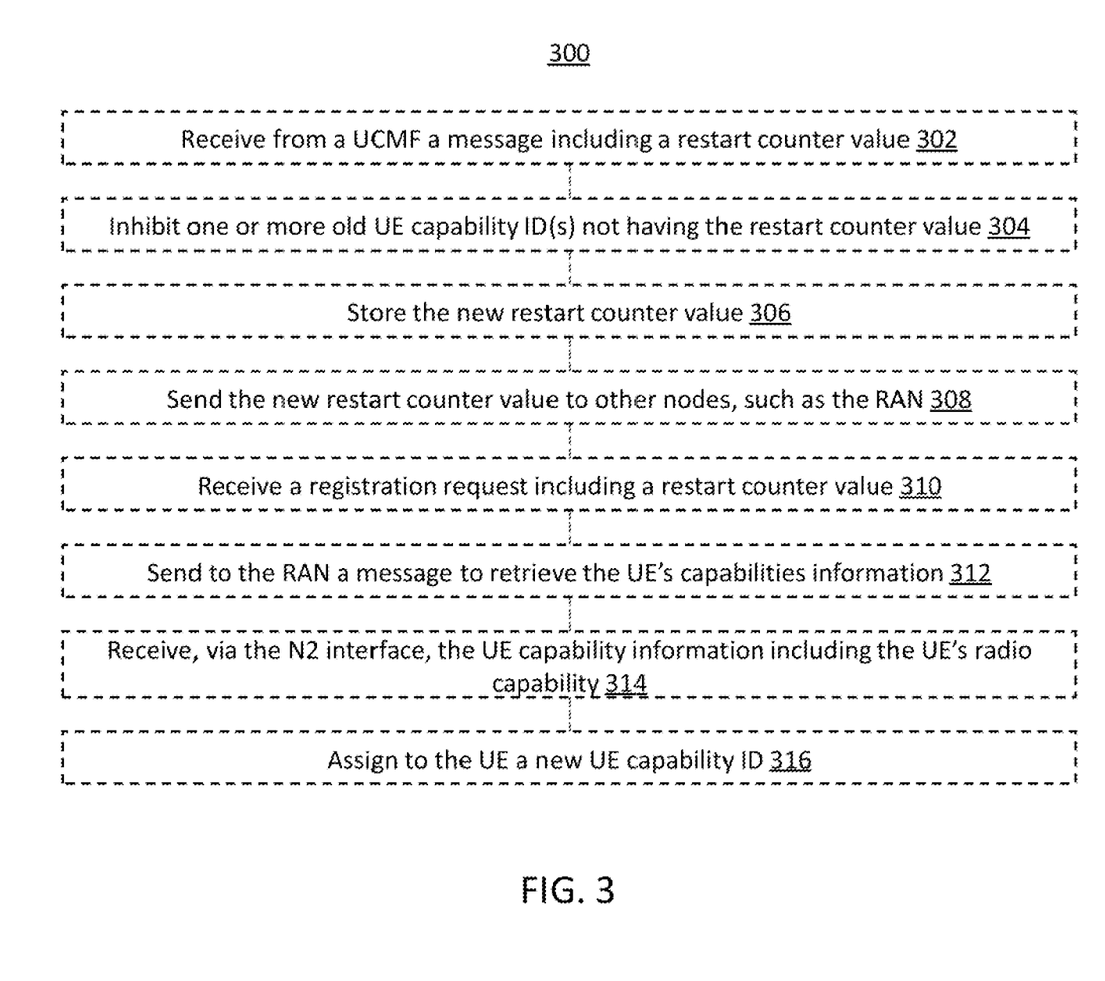
FIG. 3 depicts an example of a process flow for handling a restart counter value from the perspective of a network node, in accordance with some example embodiments.

FIG. 3 depicts an example of a process 300 for handling a UCMF's restart counter value, in accordance with some example embodiments.

At 302, a network node, such as AMF 154, may receive from a UCMF 199 a message including a restart counter value, in accordance with some example embodiments. The network node, such as the AMF, may determine that when it receives the UCMF message including the restart counter value, the UCMF has recovered from a failure or some other type of event requiring deletion of older UE radio capability IDs or marking them as stale in its cache.

In response to receiving the restart counter value, the network node, such as the AMF 154, may inhibit, at 304, the use of one or more old UE radio capability ID (s) (e.g., delete, mark them as stale, and/or keep them in the cache), in accordance with some example embodiments. Moreover, the network node may store, at 306, the new restart counter value received as noted above at 230, in accordance with some example embodiments.

The network node, such as the AMF 154, may send, at 308, the UCMF's new restart counter value to other nodes, such as the RAN 152, in accordance with some example embodiments. For example, the AMF may send, as part of an AMF configuration update, the UCMF's new restart counter value to the RAN (or other nodes including the UE).

At 310, the network node, such as the AMF 154, may receive a registration request including a restart counter value, in accordance with some example embodiments. For example, the AMF may receive UE radio capability ID including the restart counter value having a value of x. As such, the AMF may determine (e.g., based on a mismatch or comparison to what was stored before the failure and recovery of the UCMF) that the UE has a stale UE radio capability ID as the new restart counter in this example is x+1. When it is determined that the UE capability is stale based on the restart counter value as noted above, this may trigger the AMF to send, at 312, to the RAN 152 a message to retrieve the UE's capabilities information. However if the AMF stores in the cache the stale UE radio capability ID value (which is associated with the received, stale restart counter value) along with the UE radio capability information mapped to that ID, the AMF may not need to trigger retrieval of the radio capabilities from the UE, but instead the AMF may use the cached UE capabilities information (e.g., the radio capabilities).

At 314, the network node, such as the AMF 154, if it had triggered UE capabilities retrieval at 312, may receive, via the N2 interface, the UE capability information including the UE's radio capability. The network node, such as the AMF 154, may assign, at 316, to the UE a new UE radio capability ID as noted above at 299. The assignment may include requesting the UCMF to provide the UE radio capability ID corresponding to the current set of UE capabilities (e.g., radio capabilities of the UE) and to send to the UE in a registration accept message for example. Alternatively, the UE radio capability ID including or associated with the new UCMF restart counter value may be communicated in a UE configuration update message in the 5G system or other type of non-access-stratum signaling message that is initiated from the core network and received by the UE in the 5G system). If the UE receives a UE radio capability ID with a new restart counter, the UE may inhibit use of the corresponding UE radio capability ID with the old UCMF restart counter. But the UE may still retain any other UE radio capability IDs for other UE radio configurations with old restart counters in the event that these needs signaling when the UE changes radio configuration and the network caches these old values (thus avoiding the need to trigger UE capabilities retrieval from the AMF), with the understanding the UE caching policies can take into account these are stale IDs.

Figure 4:
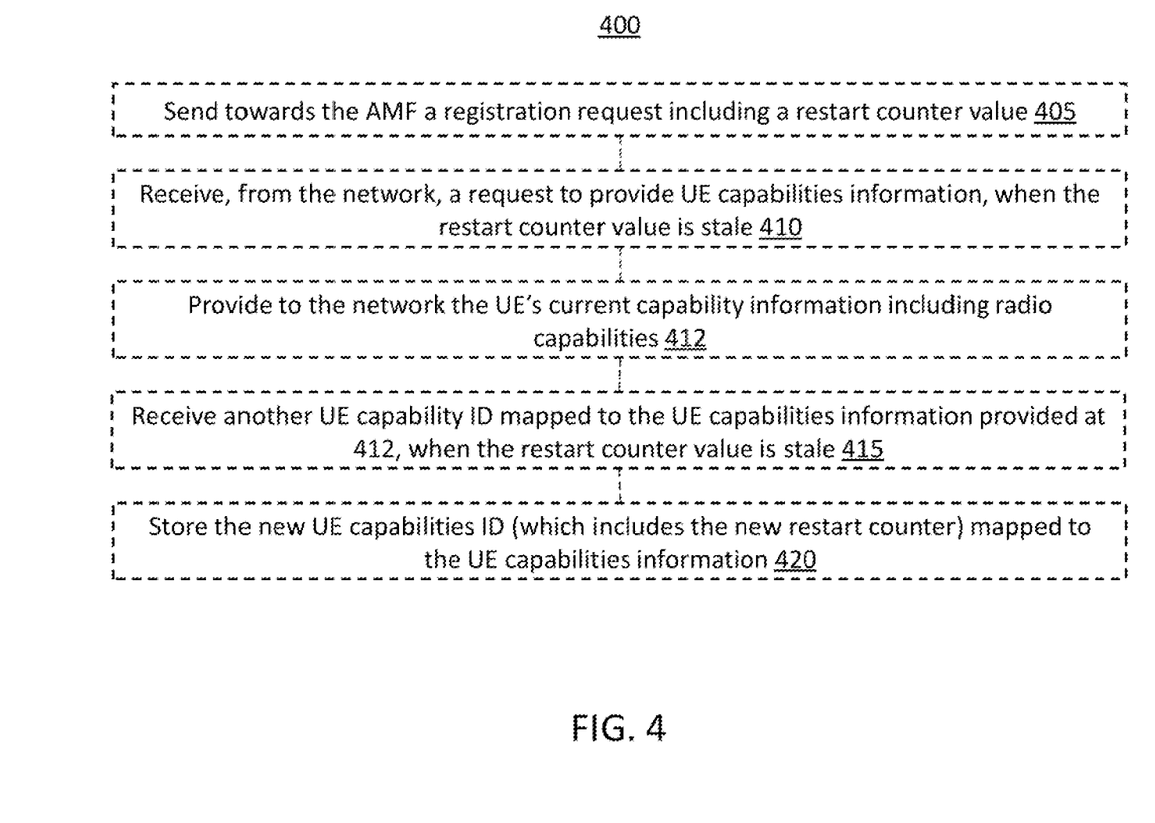
FIG. 4 depicts another example of a process flow for handling a restart counter value from the perspective of a user equipment, in accordance with some example embodiments.

FIG. 4 depicts another example of a process 400 for handling a UCMF's restart counter value, in accordance with some example embodiments.

At 405, the UE 150A may send towards the AMF 154 a registration request including a restart counter value, in accordance with some example embodiments.

When the restart counter value the UE sent is stale and the AMF does not cache the UE radio capability ID value the UE sent including or associated with this stale UCMF restart counter the UE may receive, at 410, from the network a request to provide UE capabilities information, in accordance with some example embodiments. For example, the UE 150A may receive a UE capability enquiry message from the RAN 152, which triggers the UE to respond by providing, at 412, to the network (e.g., RAN, AMF, etc.) the UE's current UE capability information including radio capabilities.

And when the restart counter value is stale, the UE may receive in a registration accept message from the AMF (or in a UE configuration update message in the 5G system or other non-access-stratum signaling message that is initiated from the core network and received by the UE in the 5G system), at 415, another UE radio capability ID mapped to the UE capabilities information provided at 412. For example, the other UE radio capability ID may comprise a new UE radio capability ID including or associated with the new restart counter generated after the recovery as noted above at 210. At 420, the UE may store the new UE radio capability ID (which includes the new restart counter) mapped to the UE capabilities information and erase the corresponding old UE radio capability ID value. The UE may, as noted, retain other UE radio capability IDs for other UE radio configurations with old restart counter values.

In some example embodiments, when the AMF detects in the UE context (which the AMF stores for a UE that is already registered) a stale UE radio capability ID value, the AMF may proactively update the UE with a new UE radio capability ID without waiting for the next UE registration, using a UE configuration update message in the 5G system (5GS) or in a GUTI reallocation command message in the EPS, and/or some other type of non-access-stratum signaling message initiated from the core network and received by the UE in the 5GS and/or EPS.

Figure 5:
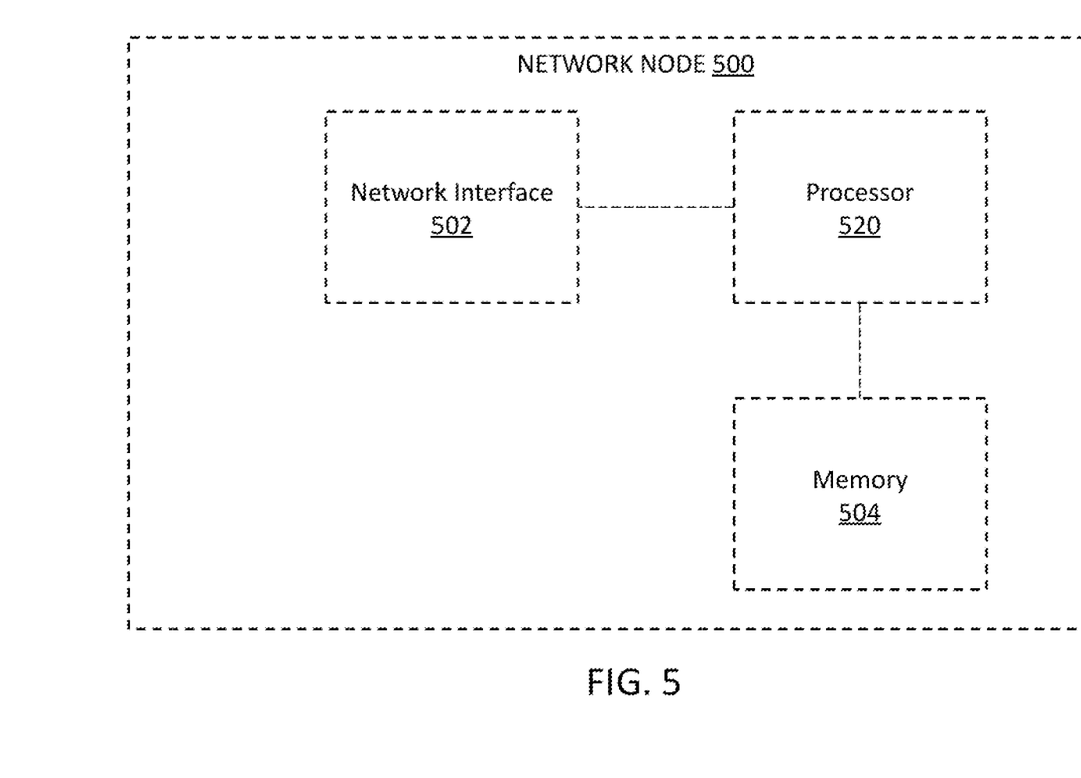
FIG. 5 depicts an example of a network node, in accordance with some example embodiments.

FIG. 5 depicts a block diagram of a network node 500, in accordance with some example embodiments. The network node 500 may be configured to provide one or more network side functions, such as a base station (e.g., RAN 152), AMF 154, UCMF 199, and/or other network nodes.

The network node 500 may include a network interface 502, a processor 520, and a memory 504, in accordance with some example embodiments. The network interface 502 may include wired and/or wireless transceivers to enable access other nodes including base stations, devices 152-180, the Internet, and/or other nodes. The memory 504 may comprise volatile and/or non-volatile memory including program code, which when executed by at least one processor 520 provides, among other things, the processes disclosed herein with respect to the network node (see, e.g., process 200, 300, and/or the like). For example, the network node may be configured to at least receive, from a user equipment capability management function, a message including a first restart counter value indicating a restart of the user equipment capability management function. The network node may also inhibit, in response to receiving the first restart counter value, one or more old user equipment capability identifiers associated with a second restart counter value, the second restart counter value being associated to a pre-restart state of the user equipment capability management function. The network node may also send the first restart counter value indicating the restart of the user equipment capability management function. The network node may also be configured to provide one or more of the following. When the network node receives a registration request including a user equipment capability identifier associated with the second restart counter value and/or when inspecting for one or more user equipment capability identifiers being stored for registered user equipment, the network node may compare the second restart counter value to the first restart counter value to determine whether the second restart counter value matches the first restart counter value. A message may be sent to the radio access network to trigger retrieval of a user equipment capability information for a user equipment. The message may be sent, when the network node does not include in its cache a user equipment capability identifier associated to the second restart counter value. A new user equipment capability identifier associated to the user equipment capability information including at least one radio capability may be assigned to the user equipment, wherein the new user equipment capability identifier may be associated to the first restart counter value. The assigned, new user equipment capability identifier may be sent to the user equipment in a registration accept message, a configuration update message, a globally unique temporary identifier reallocation command message, and/or a non-access-stratum signaling message. A new user equipment capability identifier and/or the first restart counter value may be sent to a radio access network to enable the radio access network to inhibit the use of the one or more old user equipment capability identifiers associated to the second restart counter value. The user equipment capability identifier associated with the first restart counter value and/or the first restart counter may be stored. The new user equipment capability identifier and/or the first restart counter value may be sent to a radio access network via an N2 interface or an S1 interface message. Context information including the old user equipment radio capability identifier associated to the second restart counter value may be sent toward one or more user equipment. The first restart counter value indicating the restart of the user equipment capability management function may be sent towards the radio access network.

Figure 6:
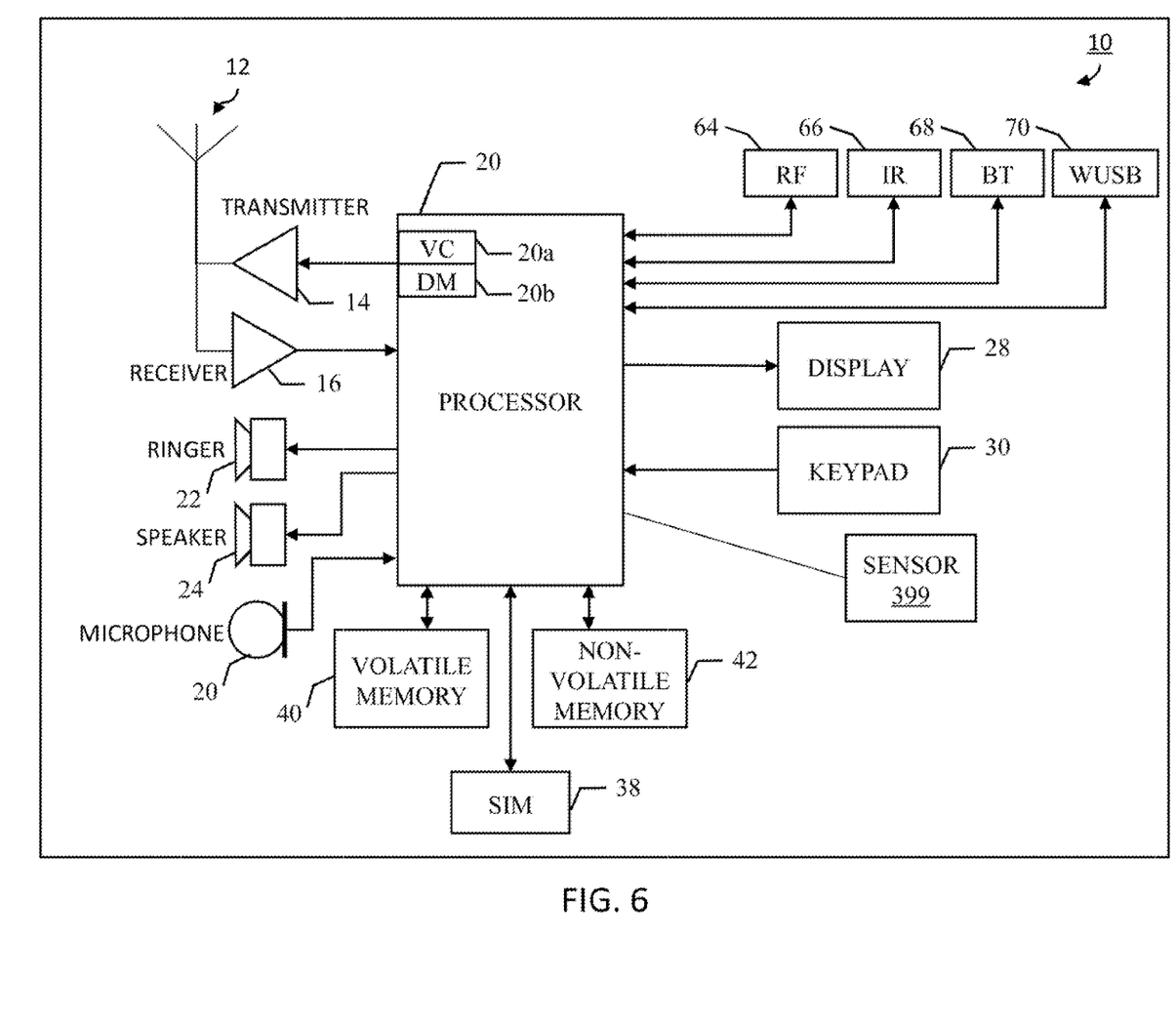
FIG. 6 depicts an example of an apparatus, in accordance with some example embodiments.

FIG. 6 illustrates a block diagram of an apparatus 10, in accordance with some example embodiments.

The apparatus 10 may represent a user equipment, such as the user equipment 150A-150C. The apparatus 10, or portions therein, may be implemented in other network nodes including base stations/WLAN access points as well as the other network nodes (e.g., devices 152-184).

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein, such as receive a first user equipment capability identifier associated with a first restart counter value indicating a restart of the user equipment capability management function; associate the first user equipment capability identifier with at least one user equipment capability; and store the first restart counter value and/or the first user equipment capability identifier associated to the at least one user equipment capability. Alternatively or additionally, the apparatus may be configured to cause the operations disclosed herein with respect to the base stations/WLAN access points and network nodes including the UEs.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE, such as receive a first user equipment capability identifier associated with a first restart counter value indicating a restart of the user equipment capability management function; associate the first user equipment capability identifier with at least one user equipment capability; and store the first restart counter value and/or the first user equipment capability identifier associated to the at least one user equipment capability.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 6, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be improved signaling.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed is:

1. A method comprising:
receiving, from a user equipment capability management function (UCMF), a message including an indicator, wherein the indicator is a field in a user equipment (UE) capability identifier (ID), and wherein the indicator has a new indicator value which indicates a new UE capability ID and is a current indicator value differing from an old indicator value indicating an outdated UE capability ID;
inhibiting, after receiving the new indicator value, use of the outdated UE capability ID associated with the old indicator value; and
sending, to a radio access network (RAN), a message including the new UE capability ID.

2. The method of claim 1, further comprising:
when a registration request is received including the outdated UE capability ID associated with the old indicator value and/or when inspecting for one or more UE capability IDs being stored for registered user equipment, UE, comparing the old indicator value to the new indicator value to determine whether the old indicator value matches the new indicator value.

3. The method of claim 1, further comprising:
assigning, to a UE, the new UE capability ID associated with UE capability information including at least one radio capability, wherein the new UE capability ID is associated with the new indicator value.

4. The method of claim 3, wherein the assigned, new UE capability ID is sent to the UE in a registration accept message, or a configuration update message, or a globally unique temporary identifier reallocation command message, or another non-access-stratum signaling message.

5. The method of claim 1, further comprising:
sending the new UE capability ID and/or the new indicator value to the RAN to enable the RAN to inhibit use of the outdated UE capability ID associated with the old indicator value and/or caused to at least store the new UE capability ID associated with the new indicator value.

6. The method of claim 1, further comprising:
sending, toward one or more UE, context information including the outdated UE capability ID associated with the old indicator value.

7. The method of claim 1, wherein the sending, to the RAN, the message including the new UE capability ID triggers retrieval of a UE capability information for a UE.

8. A method comprising:
receiving a message including a user equipment (UE) capability identifier (ID), wherein the UE capability ID has a field which is an indicator, and wherein the indicator has a new indicator value which indicates a new UE capability ID and is a current indicator value differing from an old indicator value indicating an outdated UE capability ID; and
storing the new UE capability ID associated with UE capability information including at least one radio capability.

9. The method of claim 8, further comprising:
sending, to a core network via a radio access network (RAN), a registration request including the new UE capability ID associated with the new indicator value.

10. The method of claim 8, wherein the new indicator value indicates a more recent restart of a user equipment capability management function (UCMF) when compared to the old indicator value associated with the outdated UE capability ID.

11. The method of claim 10, further comprising:
inhibiting, after receiving the UE capability ID, use of the outdated UE capability ID associated with the old indicator value.

12. The method of claim 11, wherein the inhibition of the outdated UE capability ID comprises deleting the outdated UE capability ID.

13. The method of claim 8, further comprising:
caching the outdated UE capability ID associated with the old indicator value after receiving the UE capability ID, the cache including corresponding UE capability information.

14. The method of claim 8, wherein the UE capability ID is received via a registration accept message, or a configuration update message, or a globally unique temporary identifier reallocation command message, or another non-access-stratum signaling message.

15. An apparatus comprising:
at least one processor; and
at least one memory storing instructions thereon that, when executed by the at least one processor, cause the apparatus to perform at least:
receiving, from a user equipment capability management function (UCMF), a message including an indicator, wherein the indicator is a field in a user equipment (UE) capability identifier (ID), and wherein the indicator has a new indicator value which indicates a new UE capability ID and is a current indicator value differing from an old indicator value indicating an outdated UE capability ID;
inhibiting, after receiving the new indicator value, use of the outdated UE capability ID associated with the old indicator value; and
sending, to a radio access network (RAN), a message including the new UE capability ID.

16. The apparatus of claim 15, wherein the instructions stored on the at least one memory, when executed by the at least one processor, further cause the apparatus to perform at least:
assigning, to a UE, the new UE capability ID associated with UE capability information including at least one radio capability, wherein the new UE capability ID is associated with the new indicator value.

17. The apparatus of claim 15, wherein the sending, to the RAN, the message including the new UE capability ID triggers retrieval of a UE capability information for a UE.

18. An apparatus comprising:
at least one processor; and
at least one memory storing instructions thereon that, when executed by the at least one processor, cause the apparatus to perform at least:
receiving a message including a user equipment (UE) capability identifier (ID), wherein the UE capability ID has a field which is an indicator, and wherein the indicator has a new indicator value which indicates a new UE capability ID and is a current indicator value differing from an old indicator value indicating an outdated UE capability ID; and
storing the new UE capability ID associated with UE capability information including at least one radio capability.

19. The apparatus of claim 18, wherein the instructions stored on the at least one memory, when executed by the at least one processor, further cause the apparatus to perform at least:
sending, to a core network via a radio access network (RAN), a registration request including the new UE capability ID associated with the new indicator value.

20. A non-transitory computer-readable storage medium having encoded thereon statements and instructions to cause a processor to at least:
receive, from a user equipment capability management function (UCMF), a message including an indicator, wherein the indicator is a field in a user equipment (UE) capability identifier (ID), and wherein the indicator has a new indicator value which indicates a new UE capability ID and is a current indicator value differing from an old indicator value indicating an outdated UE capability ID;
inhibit, after receiving the new indicator value, use of the outdated UE capability ID associated with the indicator value; and
send, to a radio access network (RAN), a message including the new UE capability ID.

21. A non-transitory computer-readable storage medium having encoded thereon statements and instructions to cause a processor to at least:
receive a message including a user equipment (UE) capability identifier (ID), wherein the UE capability ID has a field which is an indicator, and wherein the indicator has a new indicator value which indicates a new UE capability ID and is a current indicator value differing from an old indicator value indicating an outdated UE capability ID; and
storing the new UE capability ID associated with UE capability information including at least one radio capability.

22. The apparatus of claim 18, wherein the new indicator value indicates a more recent restart of a user equipment capability management function (UCMF) when compared to the old indicator value associated with the outdated UE capability ID.

23. The apparatus of claim 22, wherein the instructions stored on the at least one memory, when executed by the at least one processor, further cause the apparatus to perform at least:
inhibiting, after receiving the UE capability ID, use of the outdated UE capability ID associated with the old indicator value.

24. The apparatus of claim 23, wherein the inhibition of the outdated UE capability ID comprises deleting the outdated UE capability ID.

25. The apparatus of claim 18, wherein the instructions stored on the at least one memory, when executed by the at least one processor, further cause the apparatus to perform at least:
caching the outdated UE capability ID associated with the old indicator value after receiving the UE capability ID, the cache including corresponding UE capability information.

26. The apparatus of claim 18, wherein the UE capability ID is received via one of: a registration accept message, a configuration update message, a globally unique temporary identifier reallocation command message, or another non-access-stratum signaling message.

* * * * *